Aug. 10, 1965   O. WICHTERLE ETAL   3,200,095
METHOD FOR THE CONTINUOUS RAPID POLYMERIZATION OF 6-CAPROLACTAM
AND SIMILAR MONOMERS WITH SIMULTANEOUS EXTRUSION
OF THE FORMED POLYMER
Filed Dec. 15, 1959
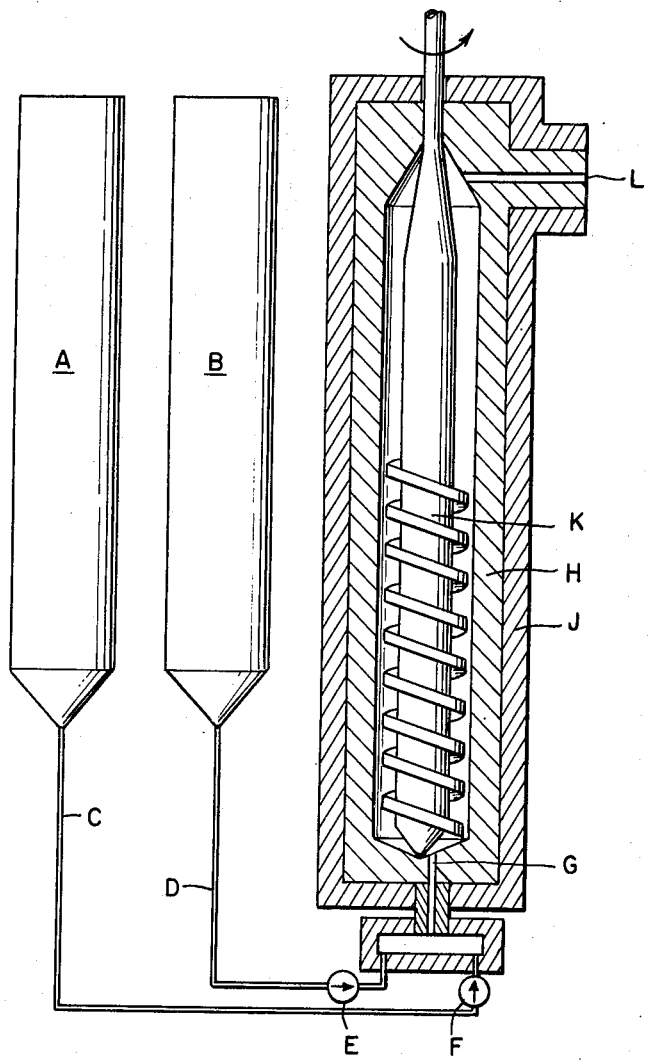
INVENTOR
OTTO WICHTERLE
JAN ŠEBENDA
JAROSLAV KRÁLÍČEK
BY
ATTORNEY

United States Patent Office 3,200,095
Patented Aug. 10, 1965

3,200,095
METHOD FOR THE CONTINUOUS RAPID POLYMERIZATION OF 6-CAPROLACTAM AND SIMILAR MONOMERS WITH SIMULTANEOUS EXTRUSION OF THE FORMED POLYMER
Otto Wichterle, 2 Vaclavkova, Prague 6, Czechoslovakia; Jan Šebenda, 53 Bubenska, Prague 7, Czechoslovakia; and Jaroslav Králíček, 12 Taboritska, Prague 11, Czechoslovakia
Filed Dec. 15, 1959, Ser. No. 859,761
5 Claims. (Cl. 260—78)

All the methods known up to now for the continuous polymerization of 6-caprolactam are carried out by means of a hydrolytic agent; however, in the course of the hydrolysis gaseous products are formed which are very injurious to the continuous polymerization process. In order to ensure easy regulation of the flow of the polymerizing material through the reaction zone by means of a pump, the pump should be fed with previously deaerated polyamide melt; the gaseous products should be first allowed to escape.

This method for the continuous polymerization can be applied only to such polyamides which exhibit sufficiently low viscosity and, as a rule, have a low molecular weight since the up to now used method of forcing the material into the reactor by means of a metering pump can be carried out only with great difficulties if the viscosity of the molten polyamide exceeds a value of $10^4$ poise.

Several methods of rapid polymerization of 6-caprolactam are known in which no gaseous products are formed. However, these methods have the disadvantage that in a certain stage of polymerization process the reaction mixture exhibits extreme viscosity. In this stage of the polymerization of the material possesses a gel-like consistence and, therefore, the polymerizing material cannot flow by gravity through the polymerization reactor in an amount necessary for the regular functioning of the pump forcing the material out of the reactor. Owing to the fact that no proper equipment has been available up to now, the advantages of the rapid methods for the polymerization of 6-caprolactam could not yet be utilized; said advantages consist in that a polymer having high molecular weight and, consequently, improved mechanical properties can be obtained after considerably short reaction period.

The present invention is based on recent experience of the inventors in the anionic (alkaline) polymerization; their new notions ensured overcoming a number of difficulties occuring in other methods of the alkaline polymerization. According to the recent knowledge, rapid polymerization of 6-caprolactam takes place in the presence of compounds having the general formula $$R-CO-N-R'$$
$$\mid$$
$$X$$

wherein R and R' designate a hydrogen atom or an alkyl group, eventually together with R' designates a hydrocarbon chain forming a nucleus, and X designates a polar substituent such as acyl, carbalkoxyl, or cyano group. A mixture of the alkali metal salt of 6-caprolactam

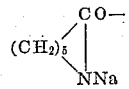

and N-acetyl-6-caprolactam

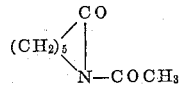

may serve as an example of such a polymerization accelerator; this mixture accelerates the polymerization of 6-caprolactam even at comparatively low temperatures (of about 100° C.).

Before the reaction the polymerization accelerators should be usually dissolved in monomeric 6-caprolactam so that they are used in the form of a solution. The single substances themselves (in the pure state) have not so expressed activity in accelerating the polymerization process as the aforementioned mixture and, consequently, in the case of the continuous polymerization the two constituents of the catalytic system should be stored in separate storage tanks. The two solutions each containing a single constituent of the used catalytic system may be mixed together either shortly before reaching the inlet into the pump, or in the pump itself, or, finally, both solutions may be introduced by means of separated metering pumps into a mixing zone which is situated immediately before the polymerization reactor.

The present invention now relates to a method for the production of high molecular polyamide, particularly that based on 6-caprolactam, in a continuous process which is combined with simultaneous, continuous manufacture of extruded articles such as rods, strips, tubes, fibres and the like. The invention may be realized by forcing the starting mixture to be polymerized which contains the monomer, the accelerator and eventually a filler at a temperature of maximum 250° C. into the reactor so that the mixture fills the reaction space completely up to the extruding die. Complete polymerization of 6-caprolactam takes place during the residence period of the hot reaction mixture in the reactor and the viscous melt of the polymer is extruded to yield, after cooling, the required articles such as rods, strips, tubes and the like.

The starting monomeric mixture may advantageously contain certain amount (at least 1%) of the polymer, which increases the viscosity of the reaction mixture; the mixture is then easier to be controlled by means of gear wheel metering pumps. The required content of the polymer in the starting mixture may be achieved either by pre-polymerization or by dissolving the obtained polymer in the mixture to be polymerized. The pre-polymerization may be accomplished either in an additional apparatus or advantageously immediately in the metering pump which is heated to the appropriate pre-polymerization temperature.

The apparatus for carrying out the method of present invention principally consists of the following parts: at least two storage tanks for the monomer which contains dissolved polymerization accelerator and, in the case of need, appropriate fillers; metering pumps (gear wheel pumps or devices of another design) for the starting mixture to be polymerized; a vertical, thick-walled reactor having a shape of an oblong cylinder which is provided with an external heating jacket maintaining inside the reactor a temperature ranging from 220 to 240° C., maximum 280° C. The reactor has an inlet opening for the starting mixture and an outlet opening attached to an extruding nozzle which is maintained at a temperature of at least 180° C. The reactor is further provided with a massive, vertically situated rotating shaft, on the lower part of which there is a helical screw conveying the reaction mixture upwards to the outlet.

The reactor is completely filled with the non-compressible, liquid reaction mixture and, therefore, the inlet pressure pump, respectively a system of pumps, simultaneously forces the polymer through the extrusion die out of the reactor. In certain stage of the polymerization process the polymerizing mixture exhibits extreme viscosity which is caused by the gel-like character of the material. Therefore, an efficient pressure pump should be used in order to overcome the resistance of this gelatinous layer of the material in the polymerization zone. In order to render easier the regular motion of the material in the polymerization reactor, the reactor is advantageously fitted with a shaft provided with a screw which helps to convey the gel-like material through the reaction space without employing very high pressure of the pumps. This assisting device per se does not operate as a pressure pump but only facilitates the heavy duty work of the inlet pressure pumps. Without using the screw conveyer the velocity of the motion of the reacting mass would be much lower near the walls than in the middle of the reactor; the reaction product would be non-homogeneous as to both physical and chemical properties in this case. The use of the screw conveyer promotes ready and uniform passage of the material even at considerably large diameters of the reactor.

Since the metering pumps such as gear wheel pumps exhibit higher efficiency in the dosage of more viscous liquids, it is advantageous to increase the viscosity of the starting mixture to be polymerized which enters the pump either by admixing to the monomer a small amount such as (1–5%) of the polyamide, or by pre-polymerizing the monomer up to a conversion of maximum 60%. Under the term "pre-polymerization," a partial polymerization of the monomer (6-caprolactam) is to be understood which takes place before introducing the reaction mixture into the pumping device.

In the manufacture of fibres it is necessary to ensure an extraordinarily exact dosage of the polymer. The outflow of the polymer from the given reactor can be advantageously regulated with great precision by attaching to the outlet side of the reactor another metering device (pump) which is properly synchronized with the inlet pressure pump. Under these conditions the gear wheel pump is sufficiently effective since the highly viscous, molten polymer is forced into this outlet pump.

The advantage of the inventioned method of apparatus resides in the fact that the combination into a single step the rapid polymerization process with the production of extruded profiles by means of a single apparatus suppresses destruction processes and other side reactions which deteriorate both physical and chemical properties of the articles. In the existing production process, the polymerization and the extrusion were usually carried out as separate steps; in the first production stage the granulated polymer was obtained and this material was subsequently extruded at higher temperatures up to 285° C. so that partial decomposition and other reactions were taking place, which resulted in lowering the viscosity of the polymer and increasing the monomer content due to partial depolymerization of the product.

*Example*

An apparatus for carrying out the process of the invention is somewhat schematically illustrated by FIG. 1. The storage tank A is charged with a solution containing 1 part of N-acetyl-6-caprolactam dissolved in 260 parts of dry 6-caprolactam, the storage tank B contains a solution of 1 part of sodium salt of 6-caprolactam dissolved in 250 parts of dry 6-caprolactam; a temperature ranging from 80 to 100° C. is maintained in both tanks and the solution is protected from undesirable reactions by means of dry nitrogen. The solutions are introduced through the circuits C and D into the gear wheel pumps E and F, which ensure the dosage of both solutions at a rate of 10 ml. min.$^{-1}$ through the channel G into the reaction space which is limited by the walls H. The conduits C and D as well as the pumps E and F are maintained at a temperature of 80 to 120° C. whilst the temperature inside the reactor is kept by means of the heating jacket J in a range of 225 to 240° C. The operation volume of the reactor in this case is 500 ml., the residence time of the reaction mixture in the reactor being about 25 min. A shaft provided with the screw conveyer K operates inside the reactor; this screw reaches approximately to the middle of the reactor beginning at the inlet of the reaction mixture. Between the circumference of the screw and the reactor walls there is a sufficiently large latitude which renders possible passage of certain part of the material along the walls. The screw conveyer promotes a spiral motion of the major portion of the material through the reactor, facilitating thus the pumping of the material through the reactor. This device ensures thorough intermixing of the reactants even at the beginning of the polymerization, simultaneously preventing the thin starting mixture from forming channels in the viscous polymer, and thus making impossible any penetration of the uncompletely polymerized reaction mixture having low viscosity into the extrusion nozzle. The fully polymerized reaction product is then extruded by the extrusion nozzle L which is maintained at a temperature of 210 to 230° C. Immediately after the extrusion die the continuously extruded profile (rod, tube, strip, or fibre) is cooled down by sprinkling with water.

What we claim is:

1. In a continuous method of simultaneously polymerizing lactams and extruding the thus-formed polymerization product into shape-retaining articles of desired shape, the steps of continuously introducing under pressure into a closed reaction vessel maintained at an elevated temperature of between 180 and 280° C. and having an extrusion opening 6-caprolactam and an alkali metal salt of caprolactam plus N-acetyl caprolactam as a polymerization accelerator so as to completely fill said vessel and to polymerize said lactam in said heated reaction vessel into a polymer adapted to be extruded at the elevated temperature prevailing within said closed heated reaction vessel and adapted to solidify upon cooling below said elevated temperature and moving the thus under pressure introduced reaction mixture by means arranged within said vessel towards said extrusion opening so as to cause by said pressure applied during introduction and said moving by said means within said reaction vessel the formed molten polymer to be extruded through said extrusion opening from said reaction vessel into extruded polymer articles having the desired shape, the duration of presence of said polymerizable 6-caprolactam and said accelerator in said reaction vessel and thereby the duration of possible reaction and polymerization of the same in said reaction vessel and the speed of extrusion depending upon the pressure applied during introduction of the 6-caprolactam and of the polymerization accelerator into said closed heated reaction vessel and upon said moving by said means in said reaction vessel; and cooling said extruded polymer articles below said elevated temperature so as to solidify the same in said desired shape thereof.

2. A method according to claim 1 wherein said extrusion opening is maintained at a temperature of at least 180° C.

3. In a continuous method of simultaneously polymerizing lactams and extruding the thus-formed polymerization product into shape-retaining articles of desired shape, the steps of continuously introducing under pressure into a closed reaction vessel maintained at an elevated temperature of between 180 and 280° C. and having an extrusion opening a polymerizable mixture comprising 6-caprolactam and an alkali metal salt of caprolactam plus N-acetyl caprolactam as a polymerization accelerator so as to completely fill said vessel and to polymerize said lactam in said heated reaction vessel into a polymer adapted to be extruded at the elevated temperature prevailing within said closed heated reaction vessel and adapted to solidify upon cooling below said elevated temperature and moving the thus under pressure introduced reaction mixture by means arranged within said vessel towards said extrusion opening so as to cause by said pressure applied during introduction and said moving by said means within said reaction vessel the formed molten polymer to be extruded through said extrusion opening from said reaction vessel into extruded polymer articles having the desired shape, the duration of presence of said polymerizable 6-caprolactam and said accelerator in said reaction vessel and thereby the duration of possible reaction and polymerization of the same in said reaction vessel and the speed of extrusion depending upon the pressure applied during introduction of the 6-caprolactam and of the polymerization accelerator into said closed heated reaction vessel and upon said moving by said means in said reaction vessel; and cooling said extruded polymer articles below said elevated temperature so as to solidify the same in said desired shape thereof.

4. In a continuous method of simultaneously polymerizing lactams and extruding the thus-formed polymerization product into shape-retaining articles of desired shape, the steps of continuously introducing under pressure into a closed heated reaction vessel maintained at an elevated temperature of between 180 and 280° C. and having an extrusion opening a polymerizable caprolactam and a polymerization accelerator therefor adapted to polymerize said caprolactam without gas formation so as to completely fill said vessel and to polymerize said lactam in said heated reaction vessel into a polymer adapted to be extruded at the elevated temperature prevailing within said closed heated reaction vessel and adapted to solidify upon cooling below said elevated temperature and moving the thus under pressure introduced reaction mixture by means arranged within said vessel towards said extrusion opening so as to cause by said pressure applied during introduction and said moving by said means within said reaction vessel the formed molten polymer to be extruded through said extrusion opening from said reaction vessel into extruded polymer articles having the desired shape, the duration of presence of said polymerizable caprolactam and said accelerator in said reaction vessel and thereby the duration of possible reaction and polymerization of the same in said reaction vessel and the speed of extrusion depending upon the pressure applied during introduction of said caprolactam and of the polymerization accelerator into said closed heated reaction vessel and upon said moving by said means in said reaction vessel; and cooling said extruded polymer articles below said elevated temperature so as to solidify the same in said desired shape thereof.

5. A method according to claim 2, wherein said polymerized lactam during extrusion of the same has a viscosity greater than $10^4$ poise.

References Cited by the Examiner

UNITED STATES PATENTS

| | | | |
|---|---|---|---|
| 2,371,709 | 3/45 | Rineer | 18—12 |
| 2,374,069 | 4/45 | Balthis | 18—8 |
| 2,562,796 | 7/51 | Koch | 260—78 |
| 2,719,776 | 10/55 | Kummel | 18—54 |
| 2,727,017 | 12/55 | Berthold | 260—78 |
| 2,735,840 | 2/56 | Lynch | 260—78 |
| 2,739,959 | 3/56 | Ney et al. | 260—78 |
| 2,806,841 | 9/57 | Barnes et al. | 260—78 |
| 2,809,958 | 10/57 | Barnes et al. | 260—78 |
| 2,891,038 | 6/59 | Barnes et al. | 260—78 |
| 2,893,055 | 7/59 | Wenzel | 18—12 |
| 2,907,755 | 10/59 | Lautenschlager et al. | 260—78 |
| 3,017,391 | 1/62 | Mottus et al. | 260—78 |
| 3,047,541 | 7/62 | Ryffel et al. | 260—78 |

FOREIGN PATENTS

| | | |
|---|---|---|
| 218,129 | 11/58 | Australia. |
| 1,067,587 | 10/59 | Germany. |

OTHER REFERENCES

Ser. No. 370,142, Schlack (A.P.C.), published June 22, 1943, abandoned.

Hall: Jour. Amer. Chem. Soc., vol. 80, 1958, pages 6404–6409.

WILLIAM H. SHORT, *Primary Examiner.*

M. V. BRINDISI, MILTON STERMAN, PHILIP E. MANGAN, LOUISE P. QUAST, *Examiners.*